(12) United States Patent
Polyakov et al.

(10) Patent No.: US 12,136,109 B2
(45) Date of Patent: *Nov. 5, 2024

(54) SYSTEMS FOR AUTONOMOUS AND AUTOMATED DELIVERY VEHICLES TO COMMUNICATE WITH THIRD PARTIES

(71) Applicant: DoorDash, Inc., San Francisco, CA (US)

(72) Inventors: Ilya Polyakov, San Francisco, CA (US); Harrison Shih, San Francisco, CA (US)

(73) Assignee: DoorDash, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/152,129

(22) Filed: Jan. 9, 2023

(65) Prior Publication Data
US 2023/0159058 A1 May 25, 2023

Related U.S. Application Data

(63) Continuation of application No. 16/842,499, filed on Apr. 7, 2020, now Pat. No. 11,548,532.

(51) Int. Cl.
*H04W 4/02* (2018.01)
*B60Q 1/50* (2006.01)
(Continued)

(52) U.S. Cl.
CPC ....... *G06Q 30/0265* (2013.01); *B60Q 1/5037* (2022.05); *B60Q 1/507* (2022.05);
(Continued)

(58) Field of Classification Search
CPC ........... G06Q 30/0265; G06Q 10/0832; G06Q 10/08355; H04W 4/029; B60W 60/00256;
(Continued)

(56) References Cited

U.S. PATENT DOCUMENTS 9,720,414 B1 8/2017 Theobald
11,274,929 B1 3/2022 Afrouzi et al.
(Continued)

FOREIGN PATENT DOCUMENTS

CN 108015779 A 5/2018
CN 110288284 A 9/2019
(Continued)

OTHER PUBLICATIONS

U.S. Appl. No. 16/842,499, USPTO e-Office Action: NOA—Notice Of Allowance And Fees Due (Ptol-85), Sep. 9, 2022, 5 pages.
(Continued)

*Primary Examiner* — Harry K Liu
(74) *Attorney, Agent, or Firm* — Kwan & Olynick LLP

(57) ABSTRACT

Described herein are various systems and processes for vehicles for delivery of real-time, on-demand orders for perishable goods, and operations thereof. The automated delivery vehicle may include a food transport container and various sensors configured to determine the location and/or surroundings of the vehicle. The automated delivery vehicle may further include a display and/or other output source configured to provide outputs to persons surrounding the automated delivery vehicle. Such outputs may include, for example, an information graphical representation (e.g., provided on a display), an audio output, and/or data communicated to a wireless device.

17 Claims, 11 Drawing Sheets

(51) Int. Cl.
  *B60W 60/00* (2020.01)
  *G06Q 10/0832* (2023.01)
  *G06Q 10/0835* (2023.01)
  *G06Q 30/0251* (2023.01)
  *G09F 21/04* (2006.01)
  *H04W 4/029* (2018.01)

(52) U.S. Cl.
  CPC ............. *B60Q 1/543* (2022.05); *B60Q 1/549* (2022.05); *B60W 60/00256* (2020.02); *G06Q 10/0832* (2013.01); *G06Q 10/08355* (2013.01); *G09F 21/04* (2013.01); *H04W 4/023* (2013.01); *H04W 4/029* (2018.02); *B60Q 1/547* (2022.05)

(58) Field of Classification Search
  CPC ...... B60Q 1/507; B60Q 1/5037; B60Q 1/549; B60Q 1/543
  USPC .................................................. 701/625, 25
  See application file for complete search history.

(56) References Cited

U.S. PATENT DOCUMENTS

| | | | |
|---|---|---|---|
| 11,548,532 B2 | 1/2023 | Polyakov et al. | |
| 2007/0271011 A1* | 11/2007 | Lee | G05D 1/0272 901/1 |
| 2015/0202770 A1 | 7/2015 | Patron et al. | |
| 2018/0005169 A1 | 1/2018 | High et al. | |
| 2018/0300676 A1 | 10/2018 | Peterson et al. | |
| 2019/0196482 A1 | 6/2019 | Reiley et al. | |
| 2019/0228375 A1* | 7/2019 | Laury | G05D 1/0088 |
| 2020/0026280 A1* | 1/2020 | Xiao | G01C 21/206 |
| 2020/0097908 A1 | 3/2020 | Glasfurd et al. | |
| 2021/0309263 A1 | 10/2021 | Polyakov et al. | |

FOREIGN PATENT DOCUMENTS

| | | |
|---|---|---|
| KR | 1020160104953 A | 9/2016 |
| KR | 1020170110341 A | 10/2017 |
| KR | 1020190103105 A | 9/2019 |
| KR | 1020190117417 A | 10/2019 |
| WO | 2020005347 A1 | 1/2020 |
| WO | 2021206980 A1 | 10/2021 |

OTHER PUBLICATIONS

U.S. Appl. No. 16/842,499, Non Final Office Action mailed May 27, 2022, 8 pgs.
International Application Serial No. PCT/US21/25181, Search Report and Written Opinion mailed Jul. 7, 2021, 10 pgs.
Int'l Application Serial No. PCT/US21/25181, IPRP mailed 10/20/227 pgs.
European Extended Search Report, Application No. 21785208.6, dated Nov. 28, 2023, 2 pages.
European Office Action, Application No. 21785208.6, dated Jan. 3, 2024, with search opinion, 5 pages.

* cited by examiner

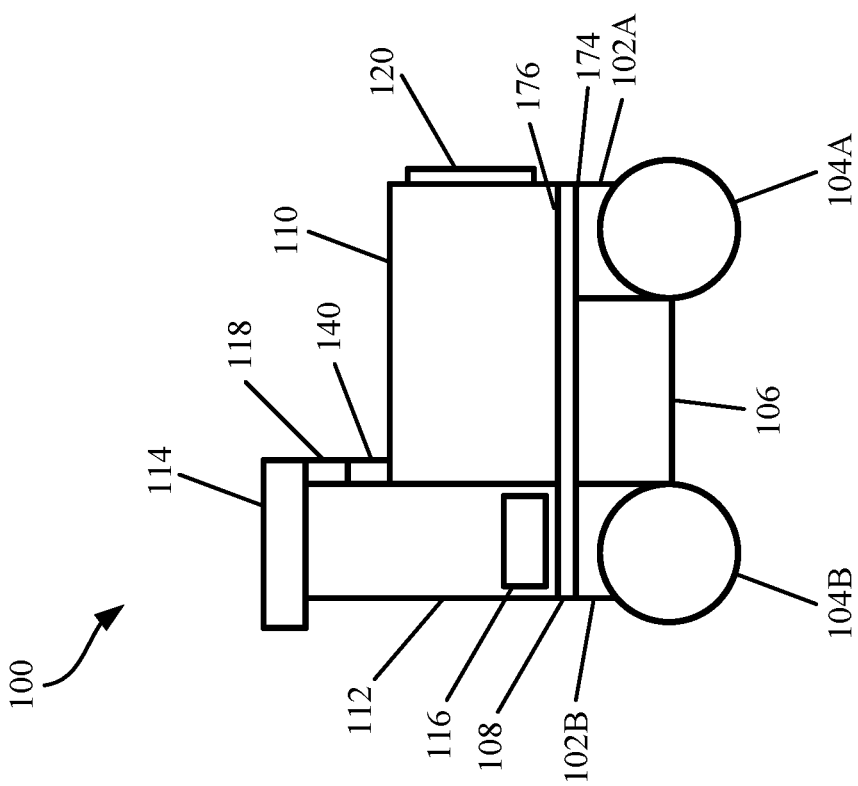

SYSTEMS FOR AUTONOMOUS AND AUTOMATED DELIVERY VEHICLES TO COMMUNICATE WITH THIRD PARTIES

CROSS-REFERENCE TO RELATED APPLICATIONS

This application is a continuation of U.S. patent application Ser. No. 16/842,499 entitled: "SYSTEMS FOR AUTONOMOUS AND AUTOMATED DELIVERY VEHICLES TO COMMUNICATE WITH THIRD PARTIES" filed on Apr. 7, 2020, which is incorporated herein by reference in its entirety for all purposes.

TECHNICAL FIELD

The present disclosure relates to a logistics platform system for facilitating real-time, on-demand delivery of perishable goods. In one example, the present disclosure relates to automated vehicles implemented for autonomous deliveries of perishable goods

BACKGROUND

Automated delivery platforms lack an on-board driver. The lack of an on-board driver to provide communications may lead to certain difficulties with bystanders and pedestrians during operation of the automated delivery platforms. Furthermore, automated delivery platforms may be serviced within depots and the lack of communications from automated delivery platforms may be problematic in terms of communications between workers within the depot and the vehicle, in such a situation as well.

Consequently, it is desirable to provide communications for automated delivery vehicles, particularly with respect to transportation of real-time on-demand deliveries of perishable goods.

SUMMARY

Provided are various mechanisms and processes for an autonomous delivery vehicle for on-demand delivery of perishable goods. In one aspect, which may include at least a portion of the subject matter of any of the preceding and/or following examples and aspects, an automated vehicle is provided that includes a food transport container, a surroundings sensor, configured to determine environmental conditions around the vehicle and output environmental data, a location sensor, configured to determine a current location of the vehicle and output location data, a display, and a controller. The controller is configured to perform operations that include receiving the environmental data, receiving the location data, determining, based on the environmental data and the location data, a first information graphical representation, and causing the display to provide the first information graphical representation.

In certain such aspects, the determining the first information graphical representation comprises determining, based at least on the location data, that the vehicle is at a first delivery depot, determining, based at least on the environmental data, that a delivery associate is proximate to the vehicle, and determining the first information graphical representation based on the determining that the vehicle is at the first delivery depot and based on the determining that the delivery associate is proximate to the vehicle. In certain such aspects, the first information graphical representation comprises a representation indicating access to the food transport container. In certain additional such aspects, the determining that the delivery associate is proximate to the vehicle comprises one or more of analyzing the environmental data to determine that a uniform of an associated delivery service is being worn by a person proximate to the vehicle, the environmental data comprising video data and receiving wireless data indicating that the delivery associate is within a threshold distance from the vehicle, where the wireless data is from a wireless device associated with the delivery associate, and where in the environmental data comprises the wireless data.

In certain such aspects, the operations further comprise determining a category of items disposed within the food transport container, where the first information graphical representation is further determined based on the category. In certain such aspects, the operations further comprise determining an urgency of delivery based on the category, where the first information graphical representation comprises a representation indicating the urgency of delivery. In certain such aspects, the operations further comprise determining, based on the category, a target transport time and determining operations instructions based on the target transport time, where the urgency of delivery is determined based on the target transport time.

In certain such aspects, the environmental data comprises video data, and the first information graphical representation comprises displaying the video data. In certain such aspects, the operations further comprise analyzing the environmental data to determine that a person proximate to the vehicle, and the first information graphical representation comprises highlighting the person within the displayed video data. In certain such aspects, the operations further comprise tracking a movement of the person proximate to the vehicle, the first information graphical representation tracks the movement of the person proximate to the vehicle. In certain additional such aspects, the operations further comprise analyzing the environmental data to determine that a category of the person proximate to the vehicle, where the determining the first information graphical representation is based on the category of the person.

In certain such aspects, the display is disposed across substantially a full width of the vehicle.

In certain such aspects, the first information graphical representation comprises a representation of a delivery route of the vehicle.

In certain such aspects, the vehicle further comprises a speaker, where the first information graphical representation further comprises an audio output, and where the operations further comprise causing the speaker to provide at least a portion of the first information graphical representation.

In certain aspects, a method is provided. The method may comprise receiving environmental data from a surroundings sensor of an autonomous food transport vehicle, the surrounding sensor configured to determine environmental conditions around the vehicle, receiving location data from a location sensor of the vehicle, the location sensor configured to determine a current location of the vehicle, determining, based on the environmental data and the location data, a first information graphical representation, and causing a display of the vehicle to provide the first information graphical representation.

In certain such aspects, the method further comprises determining, based at least on the location data, that the vehicle is at a first delivery depot, determining, based at least on the environmental data, that a delivery associate is proximate to the vehicle, and determining the first information graphical representation based on the determining that the vehicle is at the first delivery depot and based on the determining that the delivery associate is proximate to the vehicle. In certain such aspects, the first information graphical representation comprises a representation indicating access to a food transport container of the vehicle. In certain additional such aspects, the determining that the delivery associate is proximate to the vehicle comprises one or more of analyzing the environmental data to determine that a uniform of an associated delivery service is being worn by a person proximate to the vehicle, the environmental data comprising video data and receiving wireless data indicating that the delivery associate is within a threshold distance from the vehicle, where the wireless data is from a wireless device associated with the delivery associate, and where in the environmental data comprises the wireless data.

In certain such aspects, the method further comprises determining a category of items disposed within a food transport container of the vehicle, where the first information graphical representation is further determined based on the category, determining, based on the category, a target transport time, determining an urgency of delivery based on the target transport time, where the first information graphical representation comprises a representation indicating the urgency of delivery, and determining operations instructions based on the target transport time and the urgency of delivery.

In certain such aspects, the environmental data comprises video data, and the first information graphical representation comprises displaying the video data.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present disclosure.

FIG. 1A illustrates a side view of an automated perishable goods delivery system, in accordance with one or more embodiments.

DETAILED DESCRIPTION OF PARTICULAR EMBODIMENTS

Figure 1B:
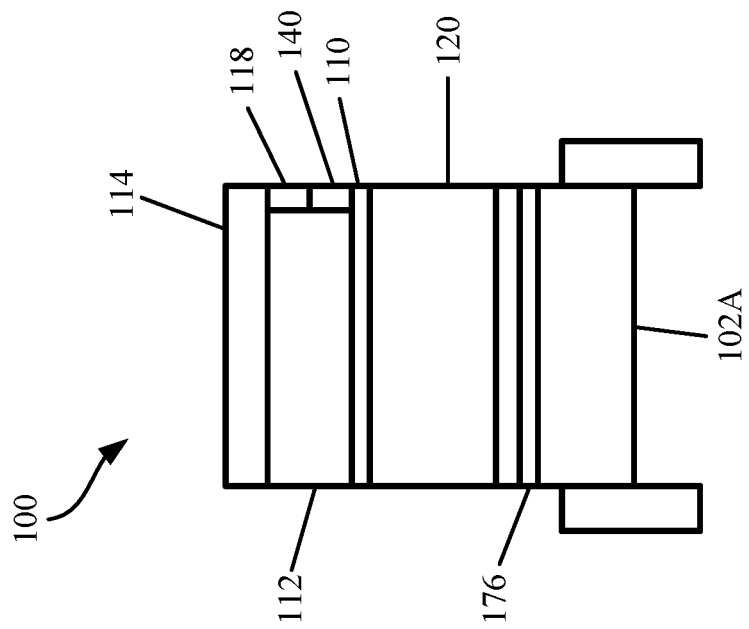
FIG. 1B illustrates a front view of the automated perishable goods delivery system of FIG. 1A, in accordance with one or more embodiments.

Reference will now be made in detail to some specific examples of the disclosure including the best modes contemplated by the inventors for carrying out the disclosure. Examples of these specific embodiments are illustrated in the accompanying drawings. While the present disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims.

In the following description, numerous specific details are set forth in order to provide a thorough understanding of the present disclosure. Particular embodiments of the present disclosure may be implemented without some or all of these specific details. In other instances, well known process operations have not been described in detail in order not to unnecessarily obscure the present disclosure.

For example, the techniques of the present invention will be described in the context of particular protocols, such as Wi-Fi or Bluetooth®. However, it should be noted that the techniques of the present invention may also be applied to variations of protocols. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

With regard to the present disclosure, logistics platforms managing real-time on-demand deliveries of perishable goods rely on accurate location, status, and routing mechanisms to allow for effective and efficient delivery experiences between providers and customers. In particular, providers located in a variety of disparate locations, particularly highly congested disparate locations, may make it difficult for couriers and delivery people to easily pick up perishable goods from these locations. These may be restaurants located in high traffic areas with limited parking. As used herein, the term "provider" may be used to describe various types of merchants that provide goods, including perishable goods, and the terms "provider" and "merchant" may be used interchangeably. As used herein, the term "delivery associate" may be used to describe a driver or courier that is delivers the goods provided by the merchant to a customer, and the terms "delivery associate" and "courier" may be used interchangeably.

Overview

The systems and methods described herein improve delivery of perishable goods from a merchant to a customer.

According to various embodiments, a depot dispatch protocol may be implemented where orders are transported between one or more aggregation depots, including merchant depots and customer depots, with autonomous delivery vehicles. Delivery associates may obtain orders from one or more such depots, either directly from the autonomous delivery vehicles or from a party that had previously unloaded orders from the autonomous delivery vehicles. The orders may then be delivered to customers through last-mile delivery techniques to their final destinations.

In various other embodiments, the systems and methods described herein may be utilized during intermediate delivery of goods. Intermediate delivery may include, for example, delivery from a provider of goods to a hub or depot. Thus, goods may be loaded onto the vehicle described herein by the provider and the vehicle may then be delivered to the hub or depot. After unloading at the hub or depot, the goods may then be loaded for last-mile delivery from the hub or depot. In certain embodiments, the examples described herein may be utilized during last-mile delivery as well.

Systems and methods herein describe an automated delivery vehicle for perishable goods. The automated delivery vehicle may include a food transport container and various sensors configured to determine the location and/or surroundings of the vehicle. The automated delivery vehicle may further include a display and/or other output source configured to provide outputs to persons surrounding the automated delivery vehicle. Such outputs may include, for example, an information graphical representation (e.g., provided on a display), an audio output, and/or data communicated to a wireless device.

In various examples, the various sensors may include a surroundings sensor, configured to determine environmental conditions around the vehicle and output environmental data and/or a location sensor, configured to determine a current location of the vehicle and output location data. The outputs may be determined by, for example, a controller. The controller may be configured to perform operations that include receiving the environmental data, receiving the location data, determining, based on the environmental data and the location data, a first information graphical representation, and causing the display to provide the first information graphical representation.

The information graphical representation may, in certain embodiments, be a graphical display configured to provide information to parties or persons proximate to the autonomous delivery vehicle. In certain embodiments, the information graphical representation may provide information directed at persons associated with the autonomous delivery vehicle (e.g., loaders, workers, and/or other persons who are affiliated with the delivery service that the autonomous delivery vehicle is affiliated with), pedestrians or other non-associated third parties, traffic control officers, and/or other autonomous systems.

In various embodiments, the graphical representations provided to various parties may include messages directed to how the autonomous delivery vehicle is being operated or plans to operate, the planned route of the autonomous delivery vehicle, instructions for operating, loading, unloading, and/or other aspects of interacting with the autonomous delivery vehicle based on the persons detected nearby the autonomous delivery vehicle.

In certain embodiments, the autonomous delivery vehicle may communicate through visual, audio, and/or other techniques. Thus, for example, the autonomous delivery vehicle may communicate through phrases, symbols, or expressions provided through a visual display, through sounds produced by a speaker, and/or through data communicated wirelessly to one or more devices.

Thus, the systems and techniques described herein allow for an autonomous delivery vehicle to communicate with other entities proximate to the autonomous delivery vehicle. The autonomous delivery vehicle can then provide communications related to the operation of the autonomous delivery vehicle to the entities proximate the autonomous delivery vehicle.

EXAMPLE EMBODIMENTS

FIG. 1A illustrates an automated perishable goods delivery system, in accordance with one or more embodiments. FIG. 1A illustrates a vehicle 100 that includes a chassis 108, drive modules 102A and 102B, battery module 106, surroundings sensor 114, control module 112, cargo module 110, display 120, location sensor 118, and speaker 140.

In various embodiments, vehicle 100 may be a vehicle with an operational profile similar to that of a go-kart, a bicycle, or an electric bicycle. That is, vehicle 100 may be of a size (e.g., length or width) that can operate in bicycle lanes. Such a width may also allow vehicle 100 to operate on sidewalks and other pedestrian walkways. Additionally, the various systems and techniques described herein may allow for vehicle 100 to be able to turn tightly (e.g., have a turning radius of five feet or less) and operate at speeds required for quick and efficient delivery (e.g., a top speed of 25 miles per hour or more) and operate in a variety of weather conditions and temperature ranges.

In the present example, vehicle 100 is managed by a logistics platform for real-time, on-demand, delivery of perishable goods. For instance, a customer may order food from a restaurant by using a mobile device application that places the order through the logistics platform associated with the logistics platform. In some instances, the user may also access the logistics platform through the internet via a computer, laptop, tablet, etc. When the customer orders the food through the logistics platform, the order is prepared at a provider site associated with the logistics platform. The provider may load orders into vehicle 100 for delivery. After vehicle 100 has been loaded, vehicle 100 may then be operated (either fully autonomously or remotely controlled) to deliver the order to the customer or to an intermediate depot (e.g., for unloading for last-mile deliveries by a delivery associate to the customer). In certain embodiments, one or a plurality or orders may be loaded by one service provider into vehicle 100, but other embodiments may have vehicle 100 stopping by multiple service providers to receive one or more orders from each service provider before the orders are delivered.

According to various examples, a provider may be a merchant that prepares perishable goods such as food at a restaurant. Other such merchants may be any combination of one or more of the following: restaurants, bars, cafes, or other vendor of food or beverages, such as a hotel.

In some examples, provider sites may also provide other perishable goods such as floral arrangements, medications, refrigerated or frozen items, live animals, etc. that may need real-time, on-demand delivery to a customer. Accordingly, although various examples in the present disclosure may describe the provider sites and logistics platform in the context of restaurants and food delivery, the mechanisms and processes described herein may also be applied to the delivery of various other perishable items. As used herein, the terms "provider" and "merchant" may be used interchangeably.

Drive modules 102A and 102B may each include one or more wheels 104A and 104B, respectively, as well as steering mechanisms, motors, suspension, and other components described herein. The steering mechanisms are coupled to the wheels to allow steering control of vehicle 100. The motors are configured to provide motive power (e.g., drive) to the wheels and the suspension can absorb bumps and impacts encountered by vehicle 100 during operation of vehicle 100.

As shown in FIG. 1A, drive module 102A is disposed on a first end of vehicle 100 and drive module 102B is disposed on a second end of vehicle 100. In certain embodiments, drive modules 102A and 102B may be substantially similar. In various embodiments, vehicle 100 may be configured to be primarily driven in one or multiple directions. In certain such embodiments, including motors within each of drive modules 102A and 102B may allow for vehicle 100 to be operated in a plurality of directions at substantially the same speed. Additionally, as each of drive modules 102A and 102B include steering mechanisms, either or both ends of vehicle 100 may provide steering control, increasing agility and versatility of vehicle 100. Such a configuration may be useful in, for example, a crowded or urban environment with limited space as vehicle 100 may be able to maneuver within limited spaces without the need to reverse or change directions.

Battery module 106 is an electrical power storage device. Battery module 106 may be configured to power one or more of the motor, steering mechanism, sensors, control systems, and other systems of vehicle 100. Though FIG. 1A illustrates a vehicle 100 with a single battery module, other embodiments may include a plurality of battery modules.

Battery module 106 may include quick release connections and may be coupled to chassis 108. As battery module 106 and drive modules 102A and 102B are items that may require regular service, battery module 106 and drive modules 102A and 102B are disposed on a first side 174 of chassis 108. Such a configuration simplifies service of vehicle 100 as items that require regular servicing may all be disposed on one portion of chassis 108. Thus, any service may only require lifting of vehicle 100 in a certain manner (e.g., to allow a mechanic access to the modules on the bottom of vehicle 100). Furthermore, service procedures are then standardized as mechanics can be trained to access the bottom of vehicle 100 in all or most service situations, avoiding confusion that results from multiple different service procedures.

As shown, battery module 106 may be disposed between drive modules 102A and 102B. In certain embodiments, battery module 106 may be directly connected to drive modules 102A and 102B (e.g., through quick release connectors). Thus, when drive modules 102A and/or 102B and battery module 106 are coupled to chassis 108, battery module 106 may be electrically coupled to drive modules 102A and/or 102B via such connectors. Thus, battery module 106 may power drive modules 102A and/or 102B.

In other embodiments, battery module 106 may provide electrical power to drive modules 102A and/or 102B via chassis 108. Thus, in such embodiments, chassis 108 may include electrical connections that couple to both battery module 106 and drive modules 102A and/or 102B. As such, battery module 106 may provide electrical power to drive modules 102A and/or 102B via chassis 108 as an intermediate connection. In certain such embodiments, chassis 108 may thus function as a power distributor to various systems of vehicle 100.

Chassis 108 may provide structural rigidity to vehicle 100. As such, chassis 108 may be, for example, a backbone chassis, a space frame, a monocoque, and/or another type of such chassis. Chassis 108 may include connections to couple to one or more modules of vehicle 100 (e.g., drive modules 102A and 102B, battery module 106, and/or other components). In certain embodiments, chassis 108 may distribute electrical power and data. Thus, for example, battery module 106 may provide electrical power first to chassis 108 before circuitry within chassis 108 distributes the electrical power to other modules. Additionally, control module 112 may provide instructions to drive modules 102A and 102B through data connections disposed within chassis 108. Thus, control module 112 may be communicatively coupled to data circuitry within chassis 108 and such data circuitry may be additionally coupled to drive modules 102A and 102B. Instructions from control module 112 may thus be communicated to drive modules 102A and 102B via chassis 108.

Control module 112 may implement various processing functions for operation of vehicle 100. In some embodiments, instructions and other information may be manually input at user interface 116. Control module 112 may include one or more processors, logic devices, memories, batteries, and other circuitry to receive inputs and determine commands for operation of vehicle 100.

According to particular example embodiments, control module 112 uses memory to store data and program instructions for operations described herein. The program instructions may control the operation of an operating system and/or one or more applications, for example. The memory or memories may also be configured to store received metadata and batch requested metadata. The memory or memories may also be configured to store data corresponding to parameters and weighted factors. In some embodiments, control module 112 further comprises a graphics processing unit (GPU). As described, the GPU may be implemented to process each image obtained by surroundings sensor 114. In some embodiments, control module 112 further includes an accelerator (e.g., a rendering accelerator chip) which may be separate from the GPU. The accelerator may be configured to speed up the processing by processing pixels in parallel to prevent overloading of control module 112 or the GPU. For example, in certain instances, ultra-high-definition images may be processed, which include many pixels, such as DCI 4K or UHD-1 resolution. In some embodiments, the accelerator may only be utilized when high system loads are anticipated or detected.

Because such information and program instructions may be employed to implement the systems/methods described herein, the present disclosure relates to tangible, machine readable media that include program instructions, state information, etc. for performing various operations described herein. Examples of machine-readable media include hard disks, floppy disks, magnetic tape, optical media such as CD-ROM disks and DVDs, magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Control module 112 may receive and provide data to modules of vehicle 100. In certain embodiments, control module 112 may receive data from such modules and provide instructions for operation of vehicle 100, thus forming a feedback loop. In such embodiments, control module 112 may be communicatively coupled to surroundings sensor 114 and instructions for operation of vehicle 100 may be based on data received from surroundings sensor 114. In certain other embodiments, control module 112 may be configured to receive inputs from various sensors (e.g., surroundings sensor 114 and location sensor 118) of vehicle 100 and determine an appropriate output. The output may be directed parties nearby vehicle 100, such as pedestrians, workers, traffic control devices, maintenance crews, associated workers, electronic devices of such parties, and/or other parties. The output may be in the form of a visual, audio, and/or data output. The output may be configured to allow for communications between vehicle 100 and parties (e.g., pedestrians, delivery associates, maintenance crew, and/or other persons) proximate to vehicle 100.

Surroundings sensor 114 may sense the environment around vehicle 100 and generate data directed to the environment around vehicle 100. Surroundings sensor 114 may include one or more of radar sensors, LIDAR sensors, visual sensors, thermal sensors, magnetic sensors, and/or other such sensors configured to sense a portion of an area proximate to vehicle 100 or around all of vehicle 100. Data from surroundings sensor 114 may be communicated to control module 112.

In various embodiments, surroundings sensor 114 may include one or more sensors and/or sensor arrays. In some embodiments, surroundings sensor 114 includes one or more of a front sensor array, a back sensor array, one or a plurality of side sensor arrays positioned to face the respective sides of vehicle 100. In an example embodiment, side sensor arrays may be positioned to face at least forty-five degrees from the front of vehicle 100. Such sensor arrays may include one or more various sensors for receiving radar, LIDAR, visual, audio, and/or other input to be utilized by onboard computer. As such, sensor arrays may operate to receive information from various areas surrounding the vehicle 100, up to and including three hundred sixty degrees around the vehicle 100.

In various embodiments, the sensor arrays may provide a Light Detection and Ranging (LIDAR) system to provide accurate 3-dimensional (3D) information on the surrounding environment. Using this data, control module 110 may implement object identification, motion vector determination, collision prediction, and vehicle avoidance strategies. The LIDAR unit may be well-suited to provide a 360° view by using a rotating, scanning mirror assembly in surroundings sensor 114.

LIDAR provides raw information using high-speed, high-power pulses of laser-light that are timed with the response of a detector to calculate the distance to an object from the reflected light. An array of detectors, or a timed camera, can be used to increase the resolution of the 3D information. The pulse is very short to enhance depth resolution, and the resulting light reflections are used to create a 3D point-like "cloud" that is analyzed to transform the data into volume identification and vector information. The transformed result is then used to calculate the vehicles' position, speed, and direction relative to these external objects, to determine the probability of collision, and instruct appropriate action, if needed.

In certain other embodiments, the sensor arrays may include one or more visual cameras. The visual cameras may image the area, or portion thereof, surrounding vehicle 100 and provide image data to control module 112. Control module 112 may then receive the image data and, through the use of image recognition techniques determine parties proximate to vehicle 100 and, in certain embodiments, categorize them accordingly. The outputs from vehicle 100 may be determined accordingly.

Surroundings sensor 114 may extend upwards from chassis 108. The elevated position of surroundings sensor 114 may be configured to place the sensors at an advantageous height to sense and detect objects along a designated route. For example, by placing the sensor module at an approximate height of between three to five feet, the sensor arrays may be able to detect both bicycles and automobiles and other vehicles commonly found on roads or sidewalks, as well as adult and children pedestrians along walkways. Since vehicle 100 may interact with human operators or customers for transport of order items, placing the sensor module at a suitable height will improve detection and recognition of humans.

The sensor module may also be able to detect lower objects and/or obstacles at the preferred height. However, in some embodiments, the sensor module may be positioned at any desired height, which may be greater than five feet, lower than three feet, or anywhere in between. For example, additional sensor arrays may be positioned on lower portions on vehicle 100. Such sensors may be used to improve detection of lower objects, such as curbs or lane lines. For example, radars may be built into the front bumper and other sides of the vehicle 100 to supplement a LIDAR system in functions such as parking, lane changing, or in high traffic areas.

Video images may provide details for a human operator but are also suitable as an input parameter for highly automated driving. In some embodiments, the sensor arrays on surroundings sensor 114 may comprise video cameras to receive visual information for an operator during remote control of the vehicle 100. Such visual information may also be processed by the onboard computer to recognize objects, such as determining lane lines or sensing objects or markers on the road, for example. In some embodiments, motion tracking processing may be implemented to recognize various objects based on the detected movement. Object recognition may also be implemented such that the vehicle 100 may be configured to follow a particular object and/or recognize various objects and identify the objects (e.g., a worker based on their uniform). Video or still images captured by cameras in the sensor modules may also be used for facial recognition to authenticate operators or customers.

A combination of two-dimensional and three-dimensional imaging may be implemented with image stitching and other processing to provide a 3600 view. In some embodiments, the video cameras may be semiconductor charge-coupled devices (CCD) or active pixel sensors in complementary metal-oxide-semiconductor (CMOS) image sensors. Mono and stereo cameras may be used in conjunction with radar systems to provide a precise evaluation of speed and distance as well as the outlines of obstacles and moving objects. Radar sensors for short-range (24 GHz) or long range (77 GHz) may be located in the front and back of the vehicle 100 to monitor traffic. These can monitor ranges from a centimeter up to a few hundred meters.

In some embodiments, sensor arrays in the sensor modules may include ultrasonic sonars, laser scanners, or other suitable sensor types. In some embodiments, surroundings sensor 114 may further include taillights to signal direction changes or other functionalities. Additional signal lights may be located on the body of vehicle 100 for increased visibility and functionality.

Control module 112 may additionally receive such data and determine instructions for operation of drive modules 102A and/or 102B. For example, control 112 may provide instructions to accelerate, brake, or turn the wheels of drive modules 102A and/or 102B based on the data from surroundings sensor 114. In various embodiments, control module 112 may be configured to transmit and/or receive data from various other parties. Thus, for example, control module 112 may include a Wi-Fi, Bluetooth®, or other short range wireless data transmitter configured to receive data from other electronic devices and/or provide data to electronic devices nearby vehicle 100.

Vehicle 100 may alternatively or additionally be controlled by an operator via remote control. In some embodiments, surroundings sensor 114 may provide visual, audio, or other information to a user device, such as wearable goggles worn by the operator. The operator may obtain surround views of the area surrounding vehicle 100 by using a remote control to pan a moveable camera in the sensor module. In some embodiments, an operator may view the surroundings by turning his head to view a corresponding location around the vehicle 100. In some embodiments, the goggles may provide augmented reality or virtual reality views of the surroundings and provide additional information to the operator.

In some embodiments, a route for vehicle 100 may be determined in real-time. In some embodiments, vehicle 100 may travel along a fixed predetermined route to and from assigned locations. Furthermore, control module 112 may comprise a location and movement sensors, such as a global positioning system (GPS), as well as an inertial measurement unit (IMU) to supplement the GPS with inertial guidance which require no external signals. Such IMU may include Micro-Electro-Mechanical Systems (MEMS) based gyros and accelerometers, spinning-wheel gyros, or a combination thereof. In some embodiments, sensors such as an IMU may also indicate the roll, pitch, and yaw positions of vehicle 100. In some embodiments, control module 112 may also be configured to measure and manage power requirements to control power, overall consumption, and thermal dissipation.

In various embodiments, control module 112 may include a user interface 116. User interface 116 may receive a user input. Such user inputs may be inputs entered through a keyboard or a touchscreen or an audio, visual (e.g., detected by one or more cameras), or other such inputs. User inputs may indicate a desired operating mode of vehicle 100, directions and/or destinations for vehicle 100, category of cargo carried by vehicle 100, and/or other instructions. Control module 112 may provide different instructions based on the user inputs, as described herein. Therefore, a user may indicate that vehicle 100 is carrying cargo that can easily spill, such as soup, and, thus, control module 112 may accordingly operate vehicle 100 with lower amounts of acceleration and cornering forces. Various techniques for controlling vehicle 100 by control module 112 are further described herein.

Location sensor 118 may be any type of device configured to determine a position of vehicle 100. In various embodiments, location sensor 118 may be configured to determine a global position of vehicle 100. Location sensor 118 may, thus, be a global positioning sensor (GPS). In other embodiments, location sensor 118 may, additionally or alternatively, include one or more additional sensors such as accelerometers or gyroscopes. Such sensors may allow for determination of the position of vehicle 100 even if no GPS signal is detected.

Display 120 may be disposed on an outside surface of vehicle 100. Display 120 may be configured to communicate one or more messages to one or more persons proximate vehicle 100. In various embodiments, display 120 may be any kind of visual display such as a light emitting diode (LED) display, a liquid crystal display (LCD), and/or another such type of display. Display 120 may, in certain embodiments, include various regions that are configured to display different types of messages and/or data. Operation of display 120 and the display of messages thereof may be controlled by data received from control module 116.

Speaker 140 may be a speaker configured to provide an audio output. The audio output may be used to communicate with persons or parties proximate to vehicle 100 (e.g., within earshot of vehicle 100) by, for example, providing a sound or other such output that can be heard.

Cargo may be contained within cargo module 110. Cargo module 110 may include one or more openings or doors that allow for cargo to be inserted into cargo module 110. In various embodiments, cargo module 110 may include features to receive pre-determined containers. That is, containers for cargo may be of one or a plurality of containers of one or more a plurality of shapes. Cargo module 110 may include features that receive and hold containers of those shapes.

In various embodiments, cargo module 110 may be configured to store various types of perishable goods for transport. In some embodiments, cargo module 110 may be configured with a heating unit to maintain the stored perishable goods at a desired temperature above the ambient temperature. In some embodiments, a cargo module 110 may be additionally, or alternatively, configured with a refrigeration unit to maintain the stored perishable goods, such as ice cream, dairy, or raw meats, at a desired temperature below the ambient temperature.

In various embodiments, the cargo module 110 may be locked or secured. Cargo module 110 may be accessed by a user, such as merchants, couriers (e.g., delivery associates), or customers, using authentication information. In some embodiments, the authentication information may include an access code entered at user interface 116. In some embodiments, the access code may be entered at a corresponding client device and transmitted to control module 112. In some embodiments, the user may use a corresponding client device to scan a barcode, including Quick Release (QR) codes, on vehicle 100 to unlock cargo module 110. In some embodiments, surroundings sensor 114 may include a camera for scanning a barcode generated at the client device. In yet further embodiments, the client devices may wirelessly communicate with vehicle 100 to unlock and access cargo module 110 such as via Wi-Fi, Bluetooth®®, or RFID. In some embodiments, the system may utilize wireless beacons to unlock the storage compartment when it is determined that vehicle 100 has arrived at a particular location, such as a merchant location or depot. In some embodiments, a user may be authenticated via facial recognition by capturing and analyzing an image of the user via a camera or other sensor of vehicle 100.

FIG. 1B illustrates a front view of the automated perishable goods delivery system of FIG. 1A, in accordance with one or more embodiments. As shown in FIG. 1B, display 120 of vehicle 100 may extend the full width of vehicle 100, or extend substantially (e.g., 80%) of the full width, at the point where it's mounted. In the embodiment of FIG. 1B, display 120 is disposed on the front of cargo module 110, but other embodiments may dispose display 120 on other portions of vehicle 100.

FIGS. 2A-E illustrate various examples of automated perishable goods delivery systems with information graphical displays and outputs thereof, in accordance with one or more embodiments. FIGS. 2A-E illustrate various configurations of the information graphical displays as used in various embodiments of autonomous delivery vehicles. FIGS. 2A-E illustrate vehicle 200, which includes display 120 disposed across the width of vehicle 200. In certain embodiments, display 120 extends upward to the top of the body of vehicle 200, though in certain such embodiments, surrounding sensor 114 may be disposed above display 120. In such a configuration, surrounding sensor 114 may be disposed to obtain a large field of view while display 120 is disposed in manner (e.g., extending to the top of vehicle 200's structure and extending for the full width of vehicle 200) to allow for the persons proximate vehicle 200 to have the greatest likelihood of observing information output on display 120.

Display 120 may, in certain embodiments, be divided into a plurality of sections. Thus, for example, display 120 may be divided into sections 202, 204, and 206. While the embodiment of FIGS. 2A-E divides display 120 into a plurality of height wise sections (e.g., sections 202, 204, and 206 are at different heights), other embodiments may divide different sections in other orientations (e.g., width wise, in certain specific sections, and/or in another orientation), as described herein. Each of sections 202, 204, and 206 may be configured to communicate different types of data, as described in FIGS. 2B-D.

Vehicle 200 further includes side extensions 220A and 220B. In various embodiments, side extensions 220A and 220B may provide additional information to other parties. Thus, for example, side extensions 220A and 220B may be configured to provide signaling information (e.g., turn signaling) or may be configured to provide information to parties disposed on either side of vehicle 200. As such, for example, if vehicle 200 detects parties to the left of vehicle 200, vehicle 200 may utilize the left sided extension to provide information instead of or in addition to outputting the information on display 120. In certain embodiments, side extensions 220A and 220B may include displays on both the forwarding facing and rearward facing portions of the extensions.

Figure 2A:
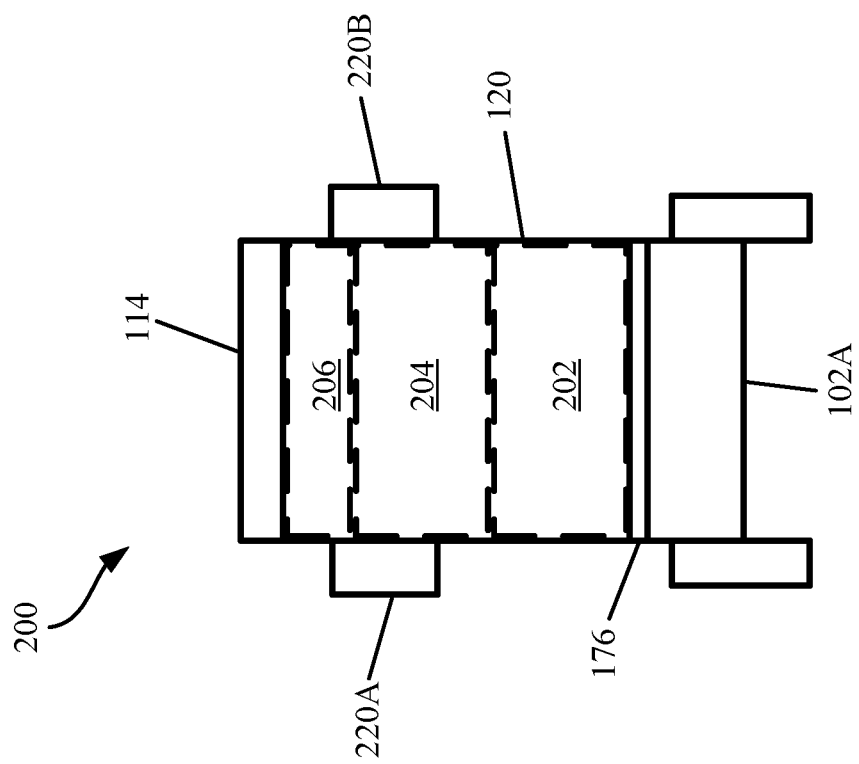
FIGS. 2A-E illustrate various examples of automated perishable goods delivery systems with information graphical displays and outputs thereof, in accordance with one or more embodiments.
Figure 2B:
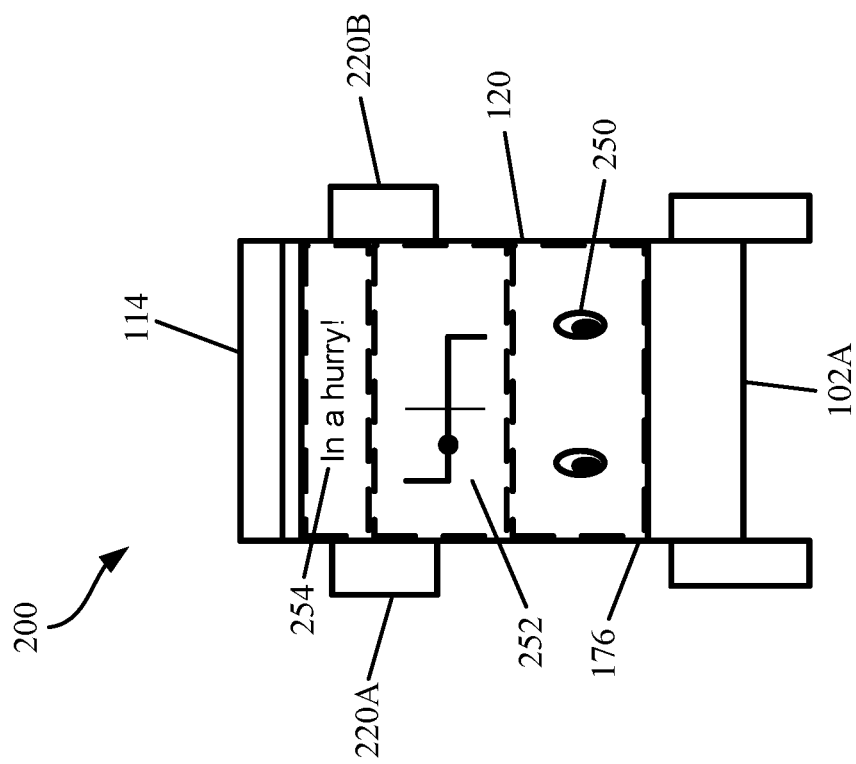
Figure 2C:
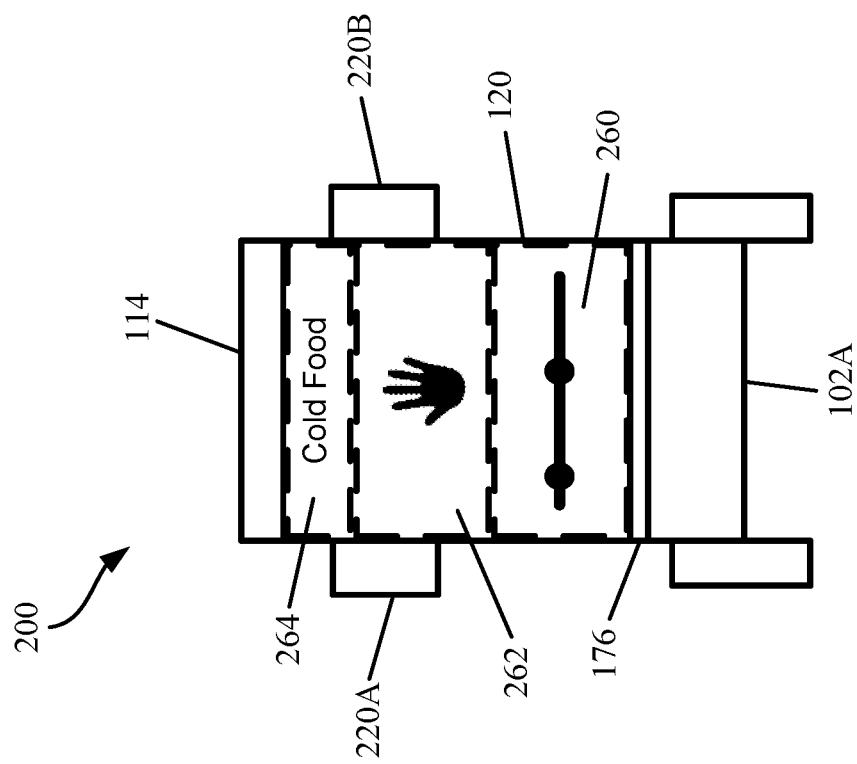
Figure 2D:
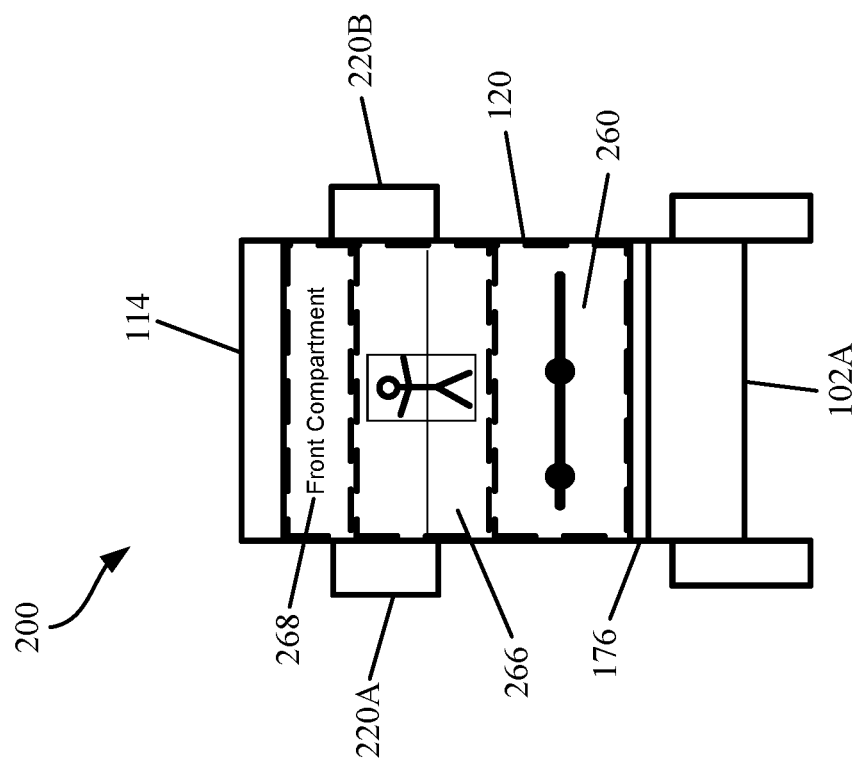

FIGS. 2B-D provide various examples of different configurations of display 120. FIG. 2B illustrates a first configuration of display 120. Display 120 includes sections 202, 204, and 206, as described in FIG. 2A.

In FIG. 2B, section 202 may be configured to provide a set of eyes 250. Eyes 250 may be configured to be oriented towards certain persons that are detected proximate to vehicle 200. Vehicle 200 may be configured to detect such persons through, for example, radar, LIDAR, or visual based image recognition techniques that can detect when a person is within a field of view of the sensors of vehicle 200. Vehicle 200 may be configured to detect the positions of such persons. Eyes 250 may then be configured to be oriented such that eyes 250 appear to be looking at the persons, to an observer, to indicate that vehicle 200 has detected such persons. In certain embodiments, eyes 250 may be a separate set of eyes.

Section 204 of FIG. 2B provides a map 252. Map 252 may indicate to a viewer the location and/or planned path of vehicle 200. Map 252 may include streets, maps, and other geographical features. Map 252 may also indicate the current location of vehicle 200 (detected via, for example, location sensor 118). Map 252 may also communicate to a person proximate to vehicle 200 to indicate how far vehicle 200 is from its destination and what path vehicle 200 plans to proceed along to reach the destination.

Section 206 of FIG. 2B provides a message 254. Message 254 may be a text message to communicate situations to the general public. Thus, for example, message 254 may indicate that vehicle 200 is in a hurry, behind schedule, ahead of schedule, has critical orders, and/or indicate another message. The messages may provide information to persons around vehicle 200.

In the embodiments of FIG. 2B, message 254 may be disposed on an upper portion of display 120 as such messages may be of highest importance. Eyes 250 may be disposed on a lower portion of display 120 as only persons nearby vehicle 200 would need to know that vehicle 200 is observing them. By placing them on the lower portion, eyes 250 may be visible to those persons. In various other embodiments, display 120 may be configured to display various messages in certain locations based on importance and visibility needs.

FIG. 2C provides another example configuration of display 120 of vehicle 200. In FIG. 2C, section 202 includes eyes 260. Eyes 260 include two eyes connected by a line. The configuration of eyes 260 allow for persons to understand the limit of movement of the eyes. Such a configuration allows for person to more confidently determine whether eyes 260 are looking at the person.

Section 204 of FIG. 2C includes symbol 262. Symbol 262 may be a graphic configured to communicate a message to a person proximate to vehicle 200. Various configurations of graphics of symbol 262 may include, for example, a hand symbol, a thumbs up, a happy face, a sad face, a wave, and/or another such signal. In various embodiments, the various graphics may be well understood messages meant to convey simple messages. Thus, for example, a hand symbol may indicate to a person nearby vehicle 200 to stop, a hand wave may indicate to a person nearby vehicle 200 to go (e.g., to cross a crosswalk), and a thumbs up may indicate to a worker nearby vehicle 200 that unloading of vehicle 200 has been completed.

In various embodiments, symbol 262 may be a static unmoving symbol or may be a video symbol. Thus, for example, symbol 262 may include a static hand symbol as described herein, or may, for example, be a video indicating how to unload vehicle 200. In certain such embodiments, vehicle 200 may be associated with a delivery service and may determine a presence of a person associated with the delivery service proximate to vehicle 200 (e.g., by identifying a uniform of the person via video data, through communications with an electronic device carried by the person, and/or through another such technique). Upon determining the presence of the person associated with the delivery service, vehicle 200 may then display a video indicating how to unload access and/or unload from cargo module 110.

Section 206 of FIG. 2C provides a message 264. Message 264 may be similar to message 254 as described in FIG. 2B. In certain embodiments, message 264 may be coordinated with eyes 260 and symbol 262. That is, for example, eyes 260 may indicate the person that vehicle 200 is addressing (e.g., a service associate) while message 264 may indicate the content of the message (e.g., "please unload") and symbol 262 may provide details about the message (e.g., through instructions or through a video indicating how the actions should be performed). Thus, all of display 120 may be coordinated based on the user that vehicle 200 is attempting to communicate with.

FIG. 2D illustrates a further example configuration of display 120 of vehicle 200. Display 120 includes eyes 260 as described in FIG. 2C. Additionally, section 204 of vehicle 200 of FIG. 2D provides a camera view 266. Camera view 266 may be a representation (e.g., visual or thermal video) of what vehicle 200 detects (e.g., through surroundings sensor 114). In certain embodiments, camera view 266 may highlight various persons detected by vehicle 200 (e.g., all persons detected, persons detected that meet certain criteria such as being a worker associated with vehicle 200, persons within a certain distance of vehicle 200, and/or other persons meeting certain criteria). Highlighting of certain persons allows for people proximate to vehicle 200 to realize who vehicle 200 has detected, who vehicle 200 is trying to communicate with, and/or other such forms of communications. In certain embodiments, the highlighting may be different based on different criteria. Thus, for example, a square highlight around a person may indicate a person that vehicle 200 has detected. A circle highlight may indicate an obstacle detected by vehicle 200. A triangular highlight may indicate a person detected by vehicle 200 that vehicle 200 is providing a message to. In certain embodiments, the highlight may track the movement of the person. That is, as the person moves to different areas, the highlight may continue to be displayed over the person.

Message 268 may be such a message. In various examples, message may be as described herein. Message 268 may be communications and/or instructions to pedestrians, workers, delivery associates, maintenance personnel, the general public, and/or other such parties. As such, message 268 may allow for vehicle 200 to communicate and provide instructions to different parties. In certain examples, vehicle 200 may include a plurality of different messages for different people detected (e.g., vehicle 200 may include a first message for a delivery worker unloading vehicle 200 and a second message for a maintenance crew member responsible for maintaining vehicle 200). The messages may be cycled through and the person being addressed may be accordingly highlighted within camera view 266.

Figure 2E:
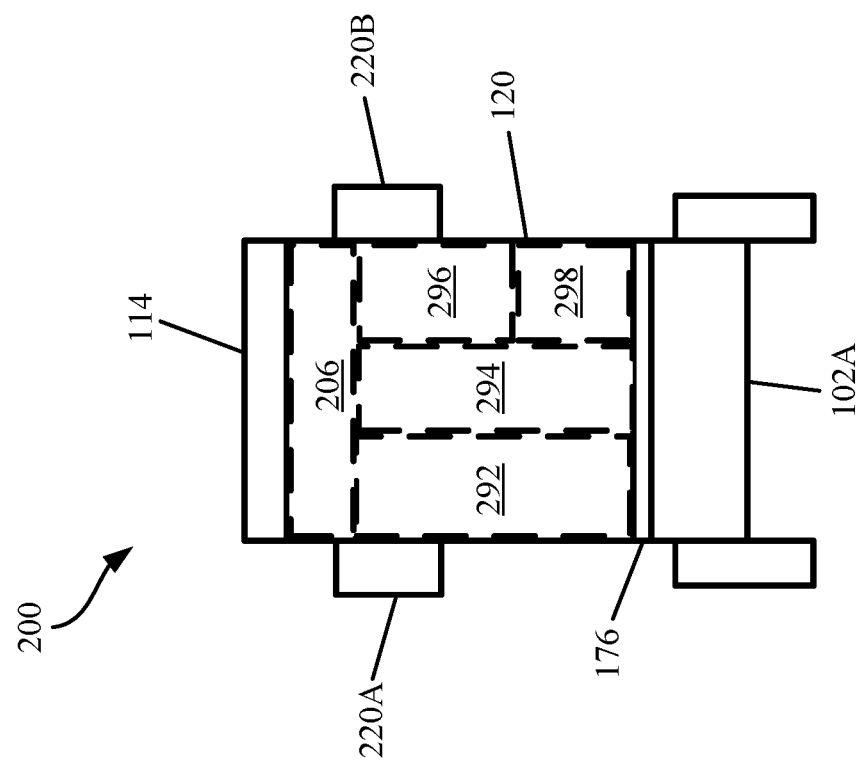

FIG. 2E illustrates a further configuration of display 120. In FIG. 2E, display 120 may be divided into a plurality of sections 206 and 292-298. As shown, while section 206 spans the full width of display 120, sections 292, 294, and 296 and 298 divides a portion of display 120 into a plurality of width wise sections. Furthermore, sections 296 and 298 further divide one width wise section into two vertical sections. Thus, various information displays described herein may be divided in different manners. It is understood that FIGS. 2A-E are illustrative examples; different embodiments may combine or utilize other versions of configuring the display.

Figure 3:
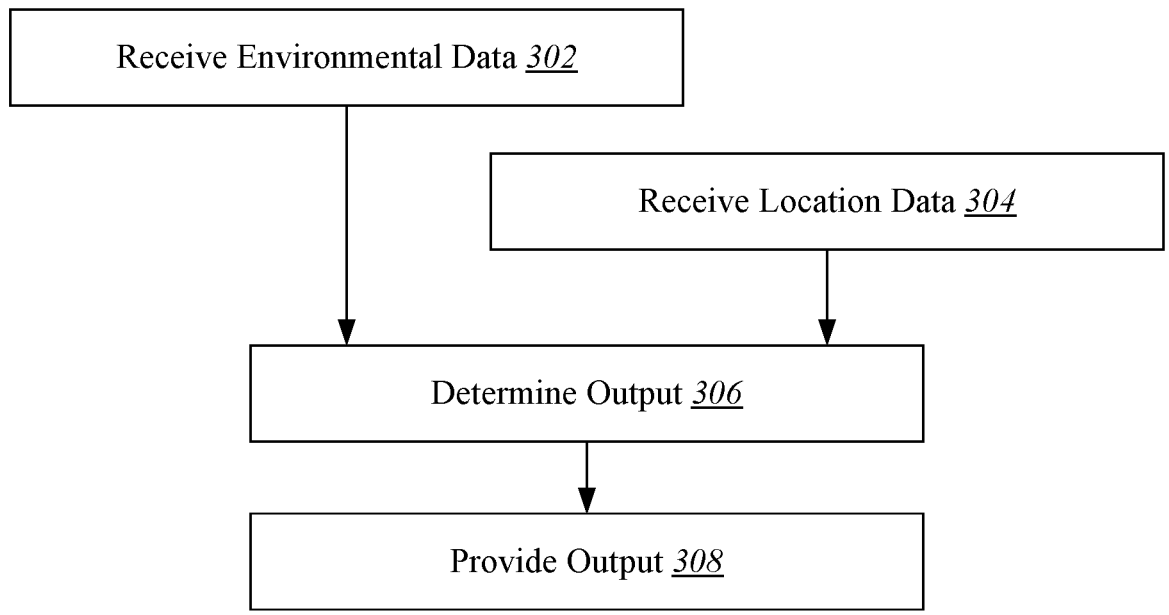
FIG. 3 illustrates an example flow process for operation of an automated perishable goods delivery system, in accordance with one or more embodiments.

FIG. 3 illustrates an example flow process for operation of an automated perishable goods delivery system, in accordance with one or more embodiments. Environmental data 302 may be received in block 302 of the technique of FIG. 3. Environmental data may be data gathered by one or more surroundings sensor and may be radar, LIDAR, visual, thermal, electronic (e.g., Wi-Fi), and/or other such data. Environmental data may allow the vehicle to determine the presence and/or absence of persons, wildlife, obstacles, traffic, delivery associates, associated workers and support personnel, and/or other objects or persons proximate to (e.g., within a threshold distance to) the vehicle.

In block 304, location data of the vehicle may be received from, for example, a location sensor of the vehicle. The location data may be, for example, GPS data of the vehicle. The location data may allow for determination, in certain embodiments, of where the vehicle is on its project delivery path. Thus, the location data may allow for the vehicle to determine which part of a road network it is located on. In other situations, the location data may allow for the vehicle to determine that it is located within a depot (e.g., a depot for loading and/or unloading and/or a maintenance depot).

In block 306, an output for a display of the vehicle is determined. The output may be determined based on the environmental data and location data received in blocks 302 and 304. The output may include a graphical representation to be shown on the display as described herein. The graphical representation may be presented on all or a portion of the display of the vehicle. In other embodiments, the output may, alternatively or additionally, include an audio output. The audio output may be, for example, a verbal command or audio information. Additionally or alternatively, the output may include a wireless communication, to be provided through wireless communications techniques to an electronic device (e.g., of a person detected to be proximate that of the vehicle).

In block 308, the output is provided. For example, the display of the vehicle may output the graphical representation. In certain embodiments where the output includes an audio output, one or more speakers of the vehicle may output the audio output through the speaker. In certain embodiments, the vehicle may determine the location of the target of the audio output (e.g., the person that is the target of the audio output may be detected to be within one side of the vehicle) and speakers disposed on that side of the vehicle may accordingly provide the output, instead of providing the audio output through all the speakers. Additionally, based on the location of the target, the graphical representation may also be output on certain portions of the display (e.g., if the target is to the left of the vehicle, the left side of the display may output the graphical representation). In embodiments where wireless communications is provided, the vehicle may wirelessly communicate data to a detected electronic device of, for example, the target.

Figure 4:
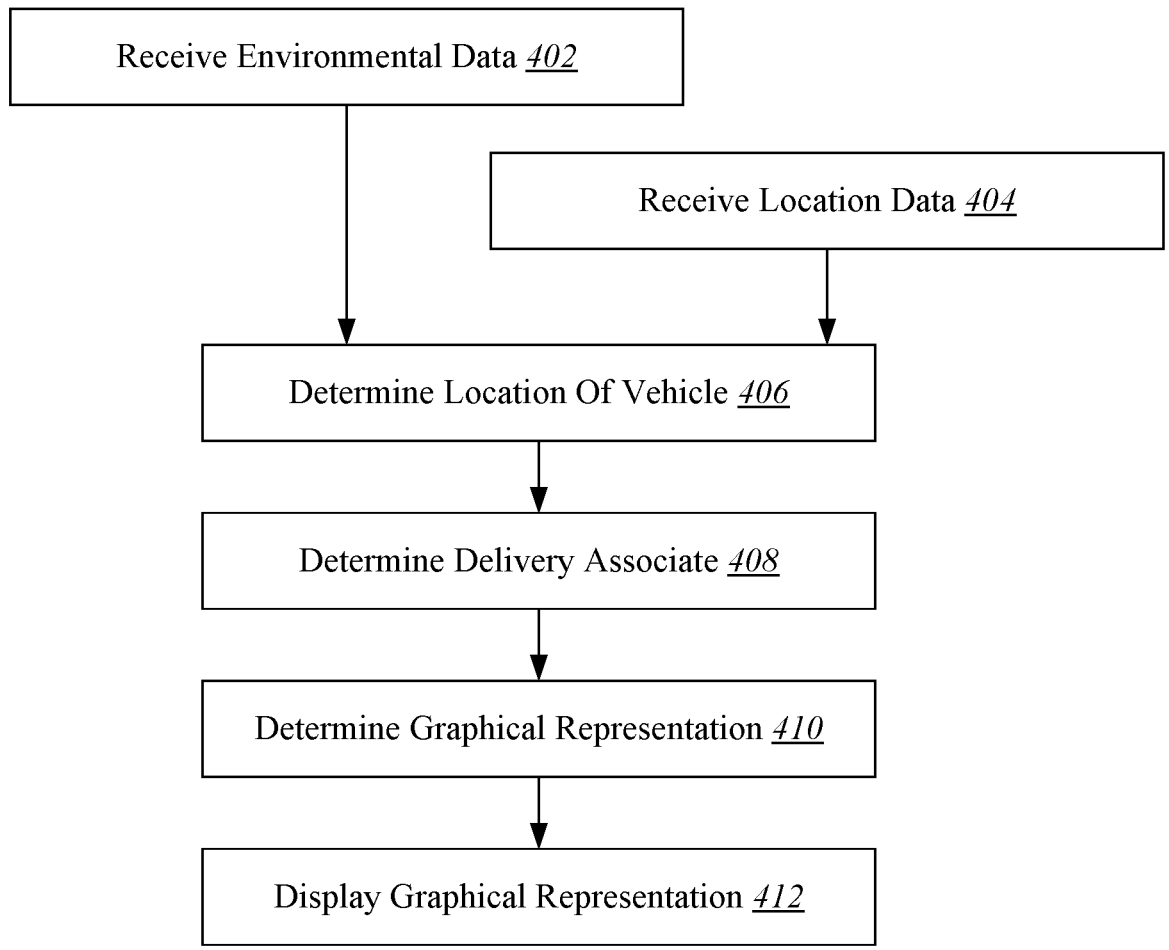
FIG. 4 illustrates another example flow process for operation of an automated perishable goods delivery system, in accordance with one or more embodiments.

FIG. 4 illustrates another example flow process for operation of an automated perishable goods delivery system, in accordance with one or more embodiments. FIG. 4 illustrates a technique for determining an output for a delivery associate or another person associated with the vehicle or a service that the vehicle is associated with, when such a person is determined to be proximate to the vehicle.

In blocks 402 and 404, environmental data and location data are received, similar to blocks 302 and 304 of FIG. 3. In block 406, the location of the vehicle is determined from, at least the location data. In certain embodiments, the location of the vehicle may be determined to be within a depot (e.g., loading or unloading depot).

In block 408, based at least on the environmental data, a delivery associate may be determined to be proximate the vehicle. In certain embodiments, the delivery associate may be determined from various environmental data received. Thus, for example, the vehicle may receive video data showing a person wearing a uniform. The uniform may be determined to match that of a uniform of a delivery associate. In another example, the vehicle may receive Wi-Fi, Bluetooth®, or other wireless data from an electronic device carried by the delivery associate. The data may identify the person as a delivery associate. In another embodiment, once the vehicle determines that it is located within the depot, the vehicle may treat all detected persons as delivery associates. Other embodiments may, alternatively or additionally, identify the delivery associate based on movement of the delivery associate. Thus, for example, a person that is walking directly to the vehicle may be determined to be a delivery associate.

Based on the determination, the graphical representation may be determined in block 410. The graphical representation may include, for example, instructions on how to load and/or unload the vehicle (e.g., how to open the vehicle), destinations for one or more items carried within the cargo module of the vehicle, and/or instructions on where each item should be loaded on the vehicle (e.g., the cargo module may include multiple compartments for cold, warm, and hot food and the instructions may indicate the compartments that are suitable for cold, warm, and hot food).

In certain embodiments, the vehicle may include orders for a plurality of delivery associates. The vehicle may determine the identity of the delivery associate (e.g., based on a nametag or based on the associate's mobile device). The vehicle may then determine one or more orders for delivery associate and the graphical representation to instruct the delivery associate to obtain those orders (e.g., the graphical representation may indicate an order number or may indicate where the orders associated with the delivery associate are located).

As such, the vehicle may determine various different graphical representations. Based on the determined graphical representation, the vehicle may display the graphical representation on, for example, a display of the vehicle and/or outputted on a speaker of the vehicle.

Figure 5:
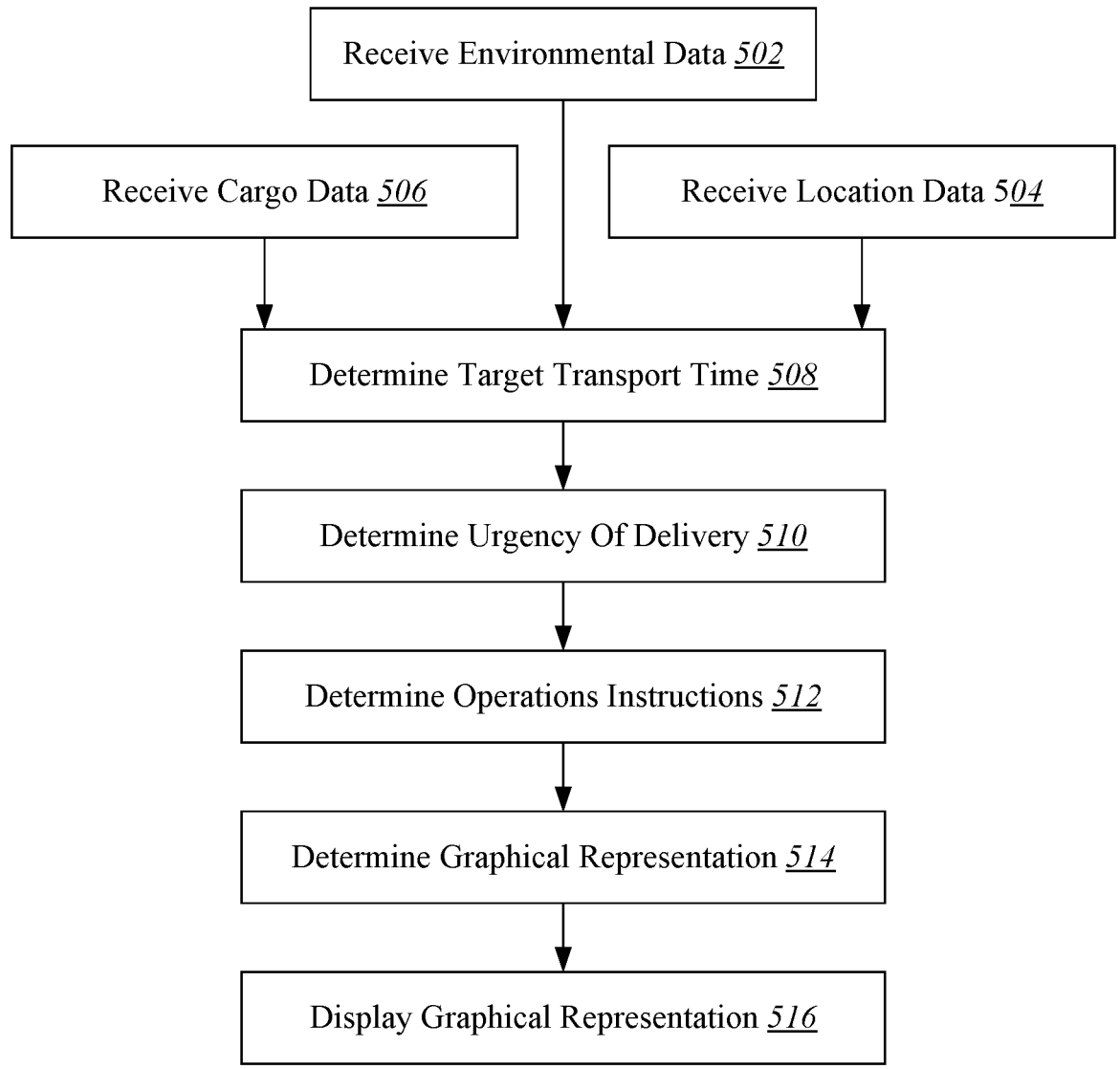
FIG. 5 illustrates a further example flow process for operation of an automated perishable goods delivery system, in accordance with one or more embodiments.

FIG. 5 illustrates a further example flow process for operation of an automated perishable goods delivery system, in accordance with one or more embodiments. In blocks 502 and 504, environmental and location data are received as described herein. Furthermore, in block 506, cargo data is received. Cargo data may include the identity of items loaded into the vehicle (e.g., soup, hamburger, ice cream), a target time for delivery, a priority of delivery, an urgency of delivery, and/or other data. The type of bay that the cargo is loaded into (e.g., heated, cooled, unheated, or another type of bay) may also be entered. Thus, for example, during loading of the vehicle, the cargo data associated with each order may be communicated to the vehicle (e.g., wirelessly or through the user interface).

Based on the cargo data, location data, and/or environmental data, a target transport time for one or more of the orders may be determined in block 508. Thus, for example, the target transport time may be the target time for delivery determined in block 508. Additionally or alternatively, the target transport time may be a time determined based on the type or identity of items loaded into the vehicle, the type of bay that the item is loaded into, and the address of the destination. Other information provided in blocks 502-506 may also be used to determine the target transport time.

Based on the target transport time, the urgency of delivery may be determined in block 510. In certain embodiments, the urgency of delivery may be based on the target transport time determined in block 508. In certain such embodiments, an estimated delivery time may be determined and the estimated delivery time may be compared to the target transport time. Based on the comparison, such as whether the estimated delivery time is within a certain threshold percentage of the target transport time (e.g., the estimated delivery time is within 75% or more of the target transport time or within another threshold percentage), the urgency of the delivery (e.g., relaxed, normal, urgent, very urgent) is determined.

Operations instructions are determined in block 512. The operations instructions may be determined based on the urgency of delivery as well as other factors. Such instructions may include handling instructions for a delivery associate performing last mile delivery (e.g., whether to deliver the item in an insulated bag, whether to always keep the item upright, and/or other such instructions). Additionally, the operations instructions may include a pace at which to deliver the item, which may be a reflection of the urgency of delivery. Thus, the operations instructions may include whether to hurry or not when delivering the item.

In certain embodiments, the vehicle may track the time remaining for each item during delivery. Thus, the vehicle may track whether a delivery is currently being performed according to schedule or is ahead or behind schedule, and the magnitude thereof. The urgency of delivery determined in block 510 and/or the operations instructions determined in block 512 may be determined and/or updated based on the results of the tracking. Additionally, traffic conditions may also be updated and may also lead to updates to the urgency of delivery and/or the operations instructions.

Based on the determinations of one or more of blocks 508-512, and other factors, the graphical representation may be determined in block 514. The graphical representation may include instructions on how to access the cargo module of the vehicle. The graphical representation may also include handling instructions for the items. The graphical representation may also include the operations instructions and/or the urgency of delivery. Based on the determination in block 514, the graphical representation may be displayed in block 516, as described herein.

Figure 6:
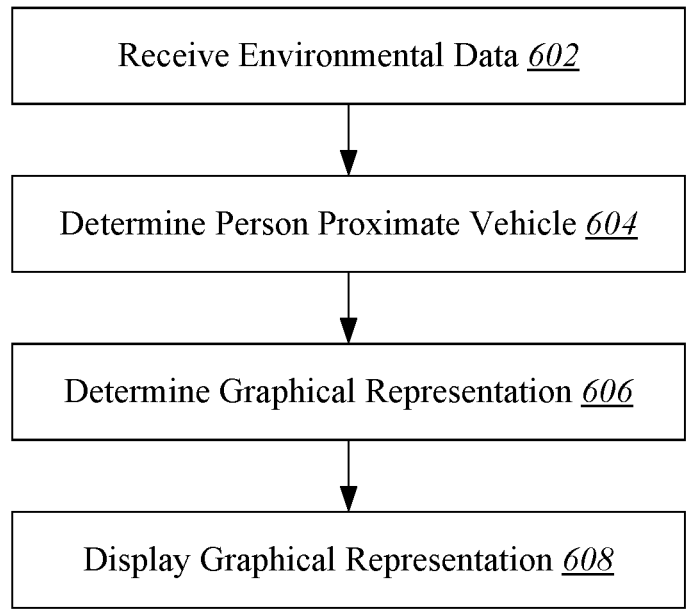
FIG. 6 illustrates an example flow process for determination of a graphical representation output by automated perishable goods delivery system based on person detected proximate to the automated perishable goods delivery system, in accordance with one or more embodiments.

FIG. 6 illustrates an example flow process for determination of a graphical representation output by automated perishable goods delivery system based on person detected proximate to the automated perishable goods delivery system, in accordance with one or more embodiments.

In block 602, environmental data is received from the surroundings sensor of the vehicle. Based on the data from the surroundings sensor, one or more persons is determined to be proximate the vehicle. In various embodiments, persons proximate to the vehicle may be persons determined to be within a threshold distance of the vehicle, persons who, based on their direction and/or speed of travel, are determined to be within a threshold distance within a threshold timeframe, and/or persons who are otherwise determined to be affected by the operation of the vehicle. In various embodiments, the vehicle may determine that one or more person is a pedestrian, cyclist, motorist, or other person that the vehicle should provide communications to (e.g., communications directed to the operation of the vehicle, commands to the person, and/or other such communications).

Based on the determination in block 602, a graphical representation is determined in block 606. The graphical representation may be communications associated with operation of the vehicle (e.g., how the vehicle is programmed to operate), commands or suggestions for the pedestrian (e.g., whether to cross in front of the vehicle or wait on the curb), and/or other information. The determined graphical representation is then displayed in block 608, through techniques described herein.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the disclosure. It is therefore intended that the disclosure be interpreted to include all variations and equivalents that fall within the true spirit and scope of the present disclosure.

What is claimed is:

1. An autonomous food transport vehicle comprising:
   a food transport container;
   a surroundings sensor;
   a display; and
   a controller, configured to perform operations comprising:
      determining that the vehicle is at a first delivery depot;
      determining a category of items disposed within the food transport container:
      determining, based on the category, video data and the determination that the vehicle is at the first delivery depot, a first information graphical representation associated with access to the food transport container;
      displaying the video data on the display; and
      analyzing the video data to determine that there is a person proximate to the vehicle.

2. The autonomous food transport vehicle of claim 1, wherein the operations further comprise:
   determining, based at least on the environmental data, that a delivery associate is proximate to the vehicle, wherein the determining the first information graphical representation is further based on the determining that the delivery associate is proximate to the vehicle.

3. The autonomous food transport vehicle of claim 2, wherein the determining that the delivery associate is proximate to the vehicle comprises one or more of:
   analyzing the environmental data to determine that a uniform of an associated delivery service is being worn by a person proximate to the vehicle, wherein the environmental data comprises video data; or
   receiving wireless data indicating that the delivery associate is within a threshold distance from the vehicle, wherein the wireless data is from a wireless device associated with the delivery associate, and where in the environmental data comprises the wireless data.

4. The autonomous food transport vehicle of claim 1, wherein the first information graphical representation comprises instructions indicating one or more steps to access the food transport container.

5. The autonomous food transport vehicle of claim 1, wherein the operations further comprise:
   determining an urgency of delivery based on the category, wherein the first information graphical representation comprises a representation indicating the urgency of delivery.

6. The autonomous food transport vehicle of claim 5, wherein the operations further comprise:
   determining, based on the category, a target transport time; and
   determining operations instructions based on the target transport time, wherein the urgency of delivery is determined based on the target transport time.

7. A method comprising:
   determining that a vehicle is at a first delivery depot;
   determining a category of items disposed within the food transport container:
   determining, based on the category, video data and the determination that the vehicle is at the first delivery depot, a first information graphical representation associated with access to a food transport container;
   displaying the video data on a display; and
   analyzing the video data to determine that there is a person proximate to the vehicle.

8. The method of claim 7, further comprising:
   determining, based at least on the environmental data, that a delivery associate is proximate to the vehicle, wherein the determining the first information graphical representation is further based on the determining that the delivery associate is proximate to the vehicle.

9. The method of claim 8, wherein the determining that the delivery associate is proximate to the vehicle comprises one or more of:
   analyzing the environmental data to determine that a uniform of an associated delivery service is being worn by a person proximate to the vehicle, wherein the environmental data comprises video data; or
   receiving wireless data indicating that the delivery associate is within a threshold distance from the vehicle, wherein the wireless data is from a wireless device associated with the delivery associate, and where in the environmental data comprises the wireless data.

10. The method of claim 7, wherein the first information graphical representation comprises instructions indicating one or more steps to access the food transport container.

11. The method of claim 7, further comprising:
    determining an urgency of delivery based on the category, wherein the first information graphical representation comprises a representation indicating the urgency of delivery.

12. The method of claim 11, further comprising:
    determining, based on the category, a target transport time; and
    determining operations instructions based on the target transport time, wherein the urgency of delivery is determined based on the target transport time.

13. A non-transitory computer readable medium storing instructions to execute a method, the method comprising:
    determining that a vehicle is at a first delivery depot;
    determining a category of items disposed within the food transport container:
    determining, based on the category, video data and the determination that the vehicle is at the first delivery depot, a first information graphical representation associated with access to a food transport container;
    displaying the video data on a display; and
    analyzing the video data to determine that there is a person proximate to the vehicle.

14. The non-transitory computer readable medium of claim 13, wherein the method further comprises:
    determining, based at least on the environmental data, that a delivery associate is proximate to the vehicle, wherein the determining the first information graphical representation is further based on the determining that the delivery associate is proximate to the vehicle.

15. The non-transitory computer readable medium of claim 14, wherein the determining that the delivery associate is proximate to the vehicle comprises one or more of:
    analyzing the environmental data to determine that a uniform of an associated delivery service is being worn by a person proximate to the vehicle, wherein the environmental data comprises video data; or receiving wireless data indicating that the delivery associate is within a threshold distance from the vehicle, wherein the wireless data is from a wireless device associated with the delivery associate, and where in the environmental data comprises the wireless data.

16. The non-transitory computer readable medium of claim 13, wherein the first information graphical representation comprises instructions indicating one or more steps to access the food transport container.

17. The non-transitory computer readable medium of claim 13, wherein the method further comprises:
   determining an urgency of delivery based on the category, wherein the first information graphical representation comprises a representation indicating the urgency of delivery.

* * * * *